US006928401B1

(12) United States Patent
Wanek (10) Patent No.: US 6,928,401 B1
(45) Date of Patent: Aug. 9, 2005

(54) INTERACTIVE REPEATER INSERTION SIMULATOR (IRIS) SYSTEM AND METHOD

(75) Inventor: John D Wanek, Denver, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/329,556

(22) Filed: Jun. 10, 1999

(51) Int. Cl.$^7$ .......................... G06F 17/50; G06F 9/45
(52) U.S. Cl. .............................. 703/14; 703/2; 716/10
(58) Field of Search ...................... 703/14, 2; 716/10

(56) References Cited

U.S. PATENT DOCUMENTS

| | | | | |
|---|---|---|---|---|
| 5,402,356 A | * | 3/1995 | Schaefer et al. ................ | 716/1 |
| 5,666,290 A | * | 9/1997 | Li et al. ......................... | 716/8 |
| 5,799,170 A | * | 8/1998 | Drumm et al. ................ | 716/2 |
| 5,838,580 A | * | 11/1998 | Srivatsa | |
| 5,838,581 A | * | 11/1998 | Kuroda .......................... | 716/6 |
| 5,859,776 A | * | 1/1999 | Sato et al. .................. | 700/121 |
| 6,044,209 A | * | 3/2000 | Alpert et al. ................... | 716/5 |
| 6,117,182 A | * | 9/2000 | Alpert et al. ................. | 703/13 |
| 6,145,116 A | * | 11/2000 | Tawada .......................... | 716/6 |
| 6,205,570 B1 | * | 3/2001 | Yamashita ..................... | 716/1 |
| 6,286,128 B1 | * | 9/2001 | Pileggi et al. | |
| 6,347,393 B1 | * | 2/2002 | Alpert et al. | |
| 6,367,051 B1 | * | 4/2002 | Pileggi et al. | |
| 6,412,101 B1 | * | 6/2002 | Chang et al. ................. | 716/10 |
| 6,463,574 B1 | * | 10/2002 | Culetu et al. | |
| 6,493,854 B1 | * | 12/2002 | Chowdhury et al. | |
| 6,510,542 B1 | * | 1/2003 | Kojima et al. | |

OTHER PUBLICATIONS

Adler, et al. "Optimizing RC tree delay in high speed ASICs through repeater insertion", 1998.*
Adler, et al., "Repeater Design to Reduce Delay and Power in Resistive Interconnect", 1998.*

Cong et al., "Simultaneous Driver and Wire Sizing for Performance and Power Optimization", 1994 IEEE/ACM International Conference on Computer-Aided Design. Published Nov. 1994.*
Culetu et al., "A Practical Repeater Insertion Method in High Speed VSLI Circuits", Proceedings of the 35th Design Automation Conference. pp. 392-395. Published Jun. 1, 1998.*
Ismail et al. "Optimum Repeater Insertion Based on a CMOS Delay Model fo On-chip RLC Interconnect", 1998.*
Lillis et al., "Optimal Wire Sizing and Buffer Insertion for Low Power and a Generalized Delay Model", 1995.*
Lillis et al. "Timing Optimization for Multi-source Nets: Characterization and Optimal Repeater Insertion", 1997.*

(Continued)

*Primary Examiner*—Kevin J. Teska
*Assistant Examiner*—Ayal Sharon (57) ABSTRACT

An interactive repeater insertion simulator (IRIS) system and method quickly and easily optimize the design of an integrated circuit (IC) interconnect for an electrical signal through the insertion of repeaters. The IRIS system utilizes the combination of a router, a repeater inserter, and a delay simulator to efficiently simulate repeater insertion. The router defines the route between more than one circuit and derives a first netlist. The first netlist is then sent to the repeater inserter to define the insertion of repeaters. A second netlist is outputted from the repeater inserter having thereupon one or more repeaters, inserted, and the physical locations of these repeaters along the interconnect for optimal performance, and minimum propagation delay. The delay simulator is then run on the second netlist to calculate the new interconnect delays. The interconnect delays may then be plotted or otherwise output for examination.

24 Claims, 11 Drawing Sheets

OTHER PUBLICATIONS

Menezes et al. "A sequential quadratic programming approach to concurrent gate and wire sizing", 1995.* van Ginneken et al. "Buffer Placement in Distributed RC-tree networks for minimal Elmore delay", 1990.*

Walker et al. "Circuit Optimization Using the Simplex Algorithm", 1989.*

Adler et al. "Repeater Design to Reduce Delay and Power in Resistive Interconnect", IEEE Transactions on Circuits and Systems. vol. 45, No. 5, pp. 607-616. May 1998.*

Chen, Chung-Ping et al. "Optimal Wire-Sizing Formula Under the Elmore Delay Model." Proc. 33$^{rd}$ DAC. pp. 487-490. 1996.*

He, Jiang-An et al. "Simultaneous Wire Sizing and Wire Spacing in Post-Layout Performance Optimization." Proc. ASP-DAC '98. pp. 373-378. Feb. 13, 1998.*

Menezes, N. et al. "Spec-based Repeater Insertion and Wire Sizing for On-Chip Interconnect." Proc. 12$^{th}$ Int'l Conf. on VLSI Design, 1999.*

Wang, Dong-Sheng et al. "A New General Connectivity Model and Its Applications to Timing-Driven Steiner Tree Routing." 1998 IEEE Int'l Conf. on Electronics, Circuits and Systems. vol. 2, pp. 71-74. Sep. 10, 1998.*

Lillis et al. "Optimal Wire Sizing and Buffer Insertion for Low Power and a Generalized Delay Model." IEEE/ACM ICCAD-95. Nov. 1995. pp. 138-143.*

Acar, E. et al. "S2P: A Stable 2-Pole RC Delay and Coupling Noise Metric" Proc. 9$^{th}$ Great Lakes Symposium VLSI, 1999. Mar. 4-6, 1999. pp. 60-63.*

Rubenstein, J. "Signal Delay in RC Tree Networks." IEEE Transactions on CAD of Integrated Circuits and Systems. Jul. 1983. vol. 2, Issue 3. pp. 202-211.*

ISmail, Y.I., et al. "Inductance Effects in RLC Trees." 9th Great Lakes Symposium VLSI, 1999. Mar. 4-6, 1999. pp. 56-59.*

Article entitled "Optimal wire sizing and buffer insertion for low power and a generalized delay model" by Lillis et al.; Proceedings of the 1995 IEEE/ACM international conference on Computer-aided design, 9 pages.

Article entitled "Timing Optimization For Multi-source Nets: Characterization And Optimal Repeater Insertion" by Lillis et al.; Design Automation conference, 1997. Proceedings of the 34th . . . ; p. 1 and pp. 214-219.

Article entitled "A practical repeater insertion method in high speed VLSI circuits" by Culetu et al.; Annual ACM IEEE Design and Automation Conference (1998), pp. 1-3; p. 1 and pp. 392-395.

Article entitled "Buffer placement in distrubted RC-tree networks for minimal Elmore delay" by Lukas P.P.P. van Ginneken; 1990., IEEE International Symposium on Circuits and Systems, p. 1, and pp. 865-868.

Article entitled "Simultaneous Driver and Wire Sizing for Performance and Power Optimization" by Cong, et al.; 1994 IEEE/ACM international conference on Computer-aided design, pp. 1-3 and pp. 206-212.

Article entitled "A Sequential Quadratic Programming Approach to Concurrent Gate and Wire Sizing" by Noel Menezes et al.; Proceedings of the 1995 IEEE/ACM international conference on Computer-aided design, pp. 1-13.

* cited by examiner

*********************** DRIVER PROPERTIES ***********************

DRIVER  ◇ PWL    ◇ INV    ◇ BUF

PWL SLOPE: ☐
P/N RATIO: ☐
BUFFER RATIO: ☐
N-FET SIZE: ☐

[HELP]

*********************** RECEIVER PROPERTIES ***********************

| NAME | INPUT CAP | | DELAY BUDGET | |
|------|-----------|---|--------------|---|
| RCV1 | ☐ | FF | ☐ | PS |
| RCV0 | ☐ | FF | ☐ | PS |

DELAY BUDGET OF ZERO WILL YEILD MINIMUM DELAY

[HELP]

************* REPEATER INSERTION CONFIGURATION *************

◇ INSERT BUFFERS       ◇ INSERT INVERTERS

P/N RATIO ☐
BUFFER RATIO ☐

N-FET SIZE: MIN ☐ UM   MAX ☐ UM   SWEEP NUMBER ☐ UM

◇ NORMAL ACCURACY       ◇ HIGH ACCURACY

[INSERT REPEATERS]

INTERACTIVE REPEATER INSERTION SIMULATOR (IRIS) SYSTEM AND METHOD

FIELD OF THE INVENTION

The present invention generally relates to integrated circuit design, and more particularly, to an interactive repeater insertion simulator (IRIS) system and method for allowing a user to quickly and easily optimize the design of an integrated circuit (IC) interconnect for an electrical signal through the insertion of repeaters (buffers or drivers).

BACKGROUND OF THE INVENTION

As operating frequencies increase to hundreds of megahertz (MHz) for multimedia processors and application specific integrated circuits (ASICs), and increase to around a gigahertz (GHz) for the next generation of central processing units (CPUs), global electrical signals, for example, reset, stall, clock, and control, have less time to traverse an integrated circuit (IC) on a microchip (chip) due to reduced cycle time. The problem is compounded even further as IC chips get larger and larger. Therefore, global signals often exhibit larger than desirable propagation delays, and the circuits which provide these signals need to be optimized so that signals may meet timing specifications.

Generally, the propagation delay associated with a signal, or the time necessary for the signal to propagate from one point to another on a chip, is caused by resistances and/or capacitances imposed upon the signal path, and is sometimes referred to as "RC delay." These resistances and capacitances also degrade the signal (decrease its rising/falling slope) as the signal propagates along a connection, which is another undesirable deleterious effect.

Many diverse approaches to this problem have been developed by researchers and published in the past few years. Consider the following, as examples: (1) N. Menezes, R. Baldick, and L. T. Pileggi, "A Sequential Quadratic Programming Approach to Concurrent Gate," Department of Electrical and Computer engineering, University of Texas at Austin, ICCAD, November 1995; (2) J. Lillis, C. K. Cheng, and T. T. Lin, "Optimal Wire Sizing and Buffer Insertion for Low Power and a Generalized Delay Model," University of California, San Diego, Calif., ICCAD, Nov. 1996; (3) J. Cong, and C. K. Koh, "Simultaneous Driver and Wire Sizing for Performance and Power Optimization," University of California, Los Angeles, Calif., IEEE, *Transactions on Very Large Scale Integration Systems*, Vol. 2, No. 4, December 1994; and (4) L. P. Ginneken, "Buffer Placement in Distributed RC-tree Networks for Minimal Elmore Delay," IBM, NY, IEEE *International Symposium on Circuits and Systems*, 1990.

One effective technique in reducing the delay of a signal involves inserting a "repeater" (also referred to in the art as a "driver" or "buffer") along the signal path. A repeater is generally a circuit, for example, an inverter or set of cascaded inverters, that reduces the RC delay and slope degradation of the propagated signal. Historically, determining where to insert repeaters has been accomplished by creating and analyzing models of IC circuits. A mathematical algorithm known as "Elmore" has been used in the past to compute RC delays before and after introduction of repeaters in a circuit. The Elmore algorithm is described in L. P. Ginneken, "Buffer Placement in Distributed RC-tree Networks for Minimal Elmore Delay," IBM, NY, IEEE *International Symposium on Circuits and Systems,* 1990. However, this process is time consuming and has traditionally been performed by having an engineer or designer review circuit models and determine where to insert repeaters.

Software tools for modeling and simulating circuits are well known in the art. Well known delay simulators (or calculators) include, for example, SPICE and OPTspice (available from Hewlett-Packard Company, U.S.A.). Although the foregoing software programs can be used for modeling and simulations, they do not automatically determine where and to what extent repeaters should be placed within a circuit, nor do they allow a user to specify interconnect specifications in conjunction with repeater insertion and to see the effects on propagation delay caused by such insertion.

Thus, a heretofore unaddressed need exists in the industry for a way to automatically and efficiently determine the most efficient positioning of repeaters when designing an IC in order to reduce signal propagation delays in the IC.

SUMMARY OF THE INVENTION

Briefly described, the invention provides a interactive repeater insertion simulator (IRIS) system and method for quickly and easily optimizing the design of an IC interconnect for an electrical signal through the insertion of repeaters (buffers or drivers).

Generally, in architecture, the IRIS system utilizes the combination of a router, a simultaneous path optimizer, and a delay simulator to efficiently simulate repeater insertion. The router defines the route between more than one circuit and derives a first netlist. The first netlist is then sent to a repeater inserter, which, in accordance with the preferred embodiment of the invention, is a simultaneous path optimization (SPO) system, to define the insertion of repeaters. A second netlist is outputted from the SPO system having thereupon one or more repeaters, inserted, and the physical locations of these repeaters along the interconnect for optimal performance, and minimum propagation delay. The delay simulator is then run on the second netlist to calculate the new interconnect delays. The interconnect delays may be plotted, if desired, thereby displaying a representation of the interconnect delays.

Further note that the IRIS system and method may be used in connection with external routing programs.

The invention can also be viewed as providing a method for decreasing propagation delay in a circuit by simulating repeater insertion. In this regard, the method can be broadly conceptualized by the following steps: defining a route for an interconnect; inserting repeaters along the route; calculating interconnect delays with the repeaters inserted therein; and plotting the interconnect delays.

Other features and advantages of the present invention will become apparent to one with skill in the art upon examination of the following drawings and detailed description. These additional features and advantages are intended to be included herein within the scope of the present invention and protected by the claims set forth in the latter part of this document.

BRIEF DESCRIPTION OF THE DRAWINGS

The present invention can be better understood with reference to the following drawing. The components of the drawings are not necessarily to scale relative to each other, emphasis instead being placed upon clearly illustrating principles of the invention. Furthermore, within the drawings, like reference numerals designate corresponding parts throughout the several views.

DETAILED DESCRIPTION OF THE PREFERRED EMBODIMENT

The interactive repeater insertion simulator (IRIS) system 100 of the present invention can be implemented in software, firmware, hardware, or a combination thereof. In the preferred embodiment of the invention, which is intended to be a nonlimiting example, the IRIS system 100 is implemented in software that is executed by a computer, for example, but not limited to, a personal computer, workstation, minicomputer, or mainframe computer.

The software-based IRIS system 100, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
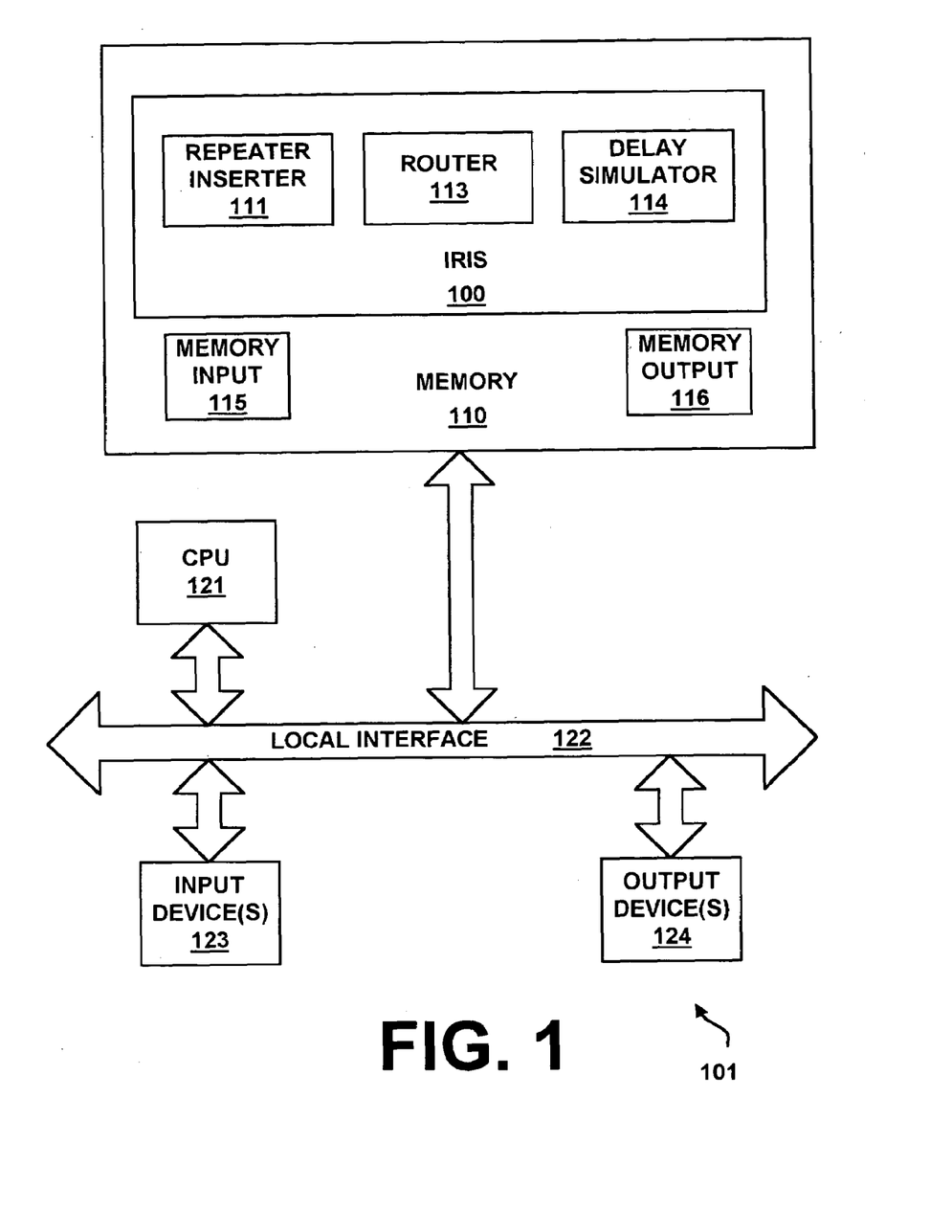
FIG. 1 is a block diagram of a workstation computer that can be used to implement the software-based IRIS system of the present invention.

By way of example and illustration, FIG. 1 is a block diagram of a workstation computer 101 that can be used to implement the software-based IRIS system 100 of the present invention. Architecturally, the computer 101 includes a memory 110 (volatile storage (e.g., RAM) and/or nonvolatile storage (e.g., ROM); typically a collection of the foregoing) having the IRIS system 100 stored therein and configured to be executed. The IRIS system 100 provides interaction between the software programs, a repeater inserter, such as, for example, a simultaneous path optimization (SPO) system 111, a router 113 and a delay simulator 114, such as, for example, SPICE. An example of a possible implementation of the SPO system 111 is described in copending, commonly assigned application entitled, "Simultaneous Path Optimization System and Method," by Norman H. Chang and John D. Wanek, assigned Ser. No. 09/327,987, the entire disclosure of which is incorporated herein by reference.

One or more memory inputs 115 are located within the memory 110 for receiving layout and configuration information for use by the programs 100, 111, 112, 113, and 114. Further, one or more memory outputs 116 are located within the memory 110 for outputting results (e.g., charts and graphs) after IRIS SYSTEM 100 computation. A suitable instruction processor, such as a central processing unit (CPU) 121, for example, a conventional commercially available microprocessor, accesses and executes the programs 100, 111, 112, 113 and 114 via a local interface 122. Optionally, one or more input devices 123 (e.g., a keyboard, mouse, etc.) configure and/or provide input to the computer system 101. Also, one or more output devices 124 (e.g., a display device, printer, network interface, etc.) provide data to another entity, system, apparatus, or user from the computer system 101 via the local interface 122.

Figure 2:
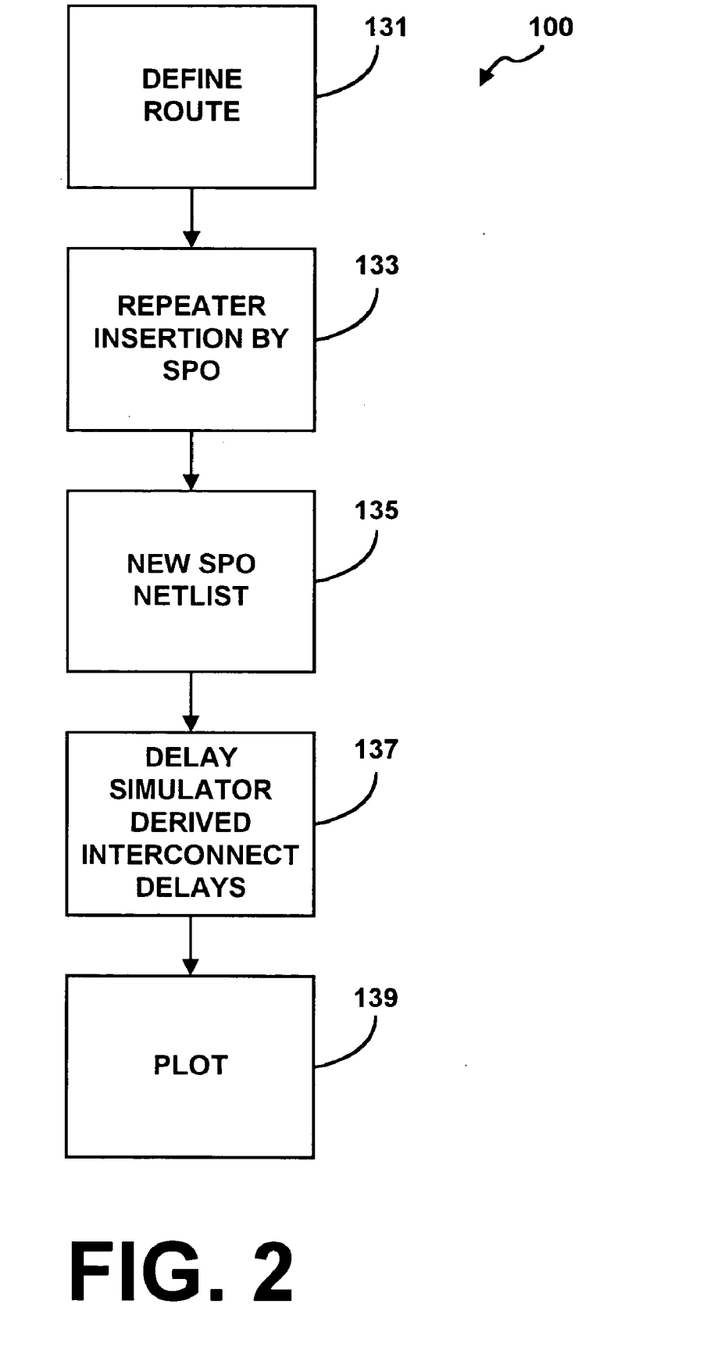
FIG. 2 is a flow chart illustrating the architecture, functionality, and operation of a possible implementation of the IRIS system of FIG. 1.

FIG. 2 is a flow chart illustrating the architecture, functionality, and operation of a possible implementation (nonlimiting example) of the IRIS system 100 (FIG. 1). In regard to this flow chart (as well as those shown in FIGS. 3, 4, and 8), each block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

Referring to FIG. 2, the topology of a route between more than one circuit is first defined, as indicated by block 131. The purpose of defining the route is to optimize interconnect to reduce delay. Any of a number of different routing tools may be utilized to define the route, including, but not limited to, a router 113, an artwork editor, or any other commercially available routing program. The preferred embodiment of the IRIS system utilizes the router 113. As is known by one of ordinary skill in the art, the fields inputted into the routing tool may include the characteristics of the elements on either side of the route, or desired characteristics of the route itself. By way of the router 113, a floor plan, a connectivity model, and an optional route configuration file is utilized to derive a netlist.

As mentioned hereinabove, the output of defining the route produces a netlist. The netlist is essentially a software file having a description, or model, of an integrated circuit indicating the various branches, or signal paths, of the circuit as well as resistances and capacitances associated with the branches. The netlist may be derived by any suitable means, even manually, although this is not preferred. This netlist is then sent to the SPO system 111 to define the insertion of repeaters, as indicated by block 133.

As shown by FIG. 2, and indicated by block 135, the output of the SPO system 111 is a new netlist having thereupon a repeater, or repeaters, inserted. Further, the SPO system 111 outputs the physical locations of the repeaters along the interconnect for optimal performance, and minimal propagation delay. This location definition is provided with reference to x and y coordinates.

Once the new netlist is outputted, having the repeaters therein, a delay simulator, such as, for example, SPICE or OPTspice, is run to calculate the new interconnect delays for the new netlist, as indicated by block 137. Finally, as indicated by block 139, the new interconnect delays are plotted, thereby displaying a representation of the interconnect delays.

Figure 3:
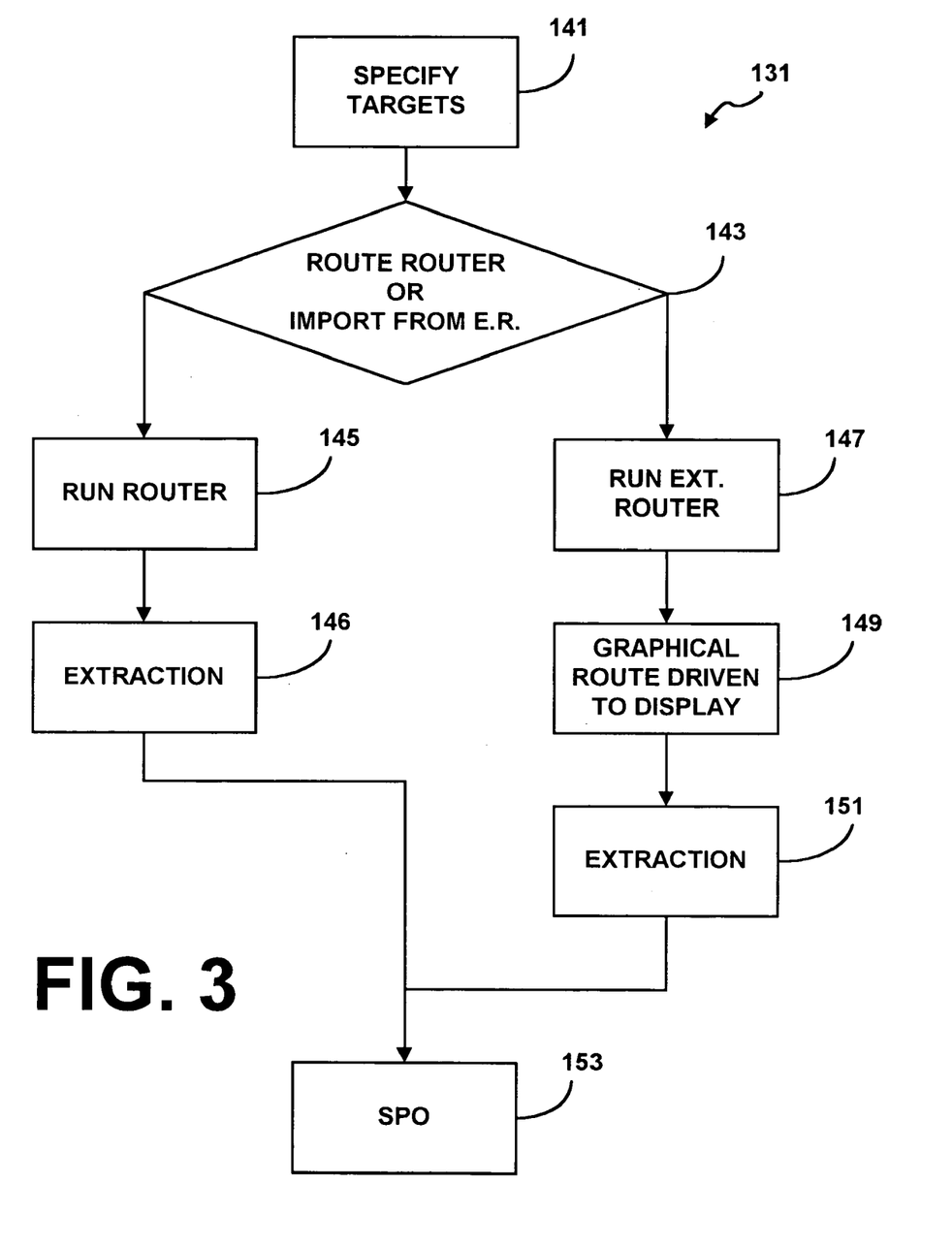
FIG. 3 is a flow chart illustrating the architecture, functionality, and operation of a possible implementation of the block denoting defining a route, in accordance with FIG. 2.

FIG. 3 represents an example of a possible implementation of the define route block 131 (FIG. 2). In accordance with the preferred embodiment of the invention, a route containing specific target information is designated (block 141). This information may be in the form of a netlist, which is extracted from the route and is generally a description of an electrical network. The netlist may indicate the following information: a source node, a plurality of sink nodes, a plurality of electrical branches connecting the source node with each sink node, a plurality of resistance associated respectively with the branches, and a plurality of capacitances associated respectively with the branches.

In the alternative, a route may be imported from a software program or design database. An example of such a software program may include, but is not limited to, Opus, by Cadence Design Systems. It should be noted that importing a route from another source should only be implemented if there is an existing database with route data and connection points previously defined.

As indicated by block 143, a choice is then made as to whether to run the router 113 (FIG. 1), or, in the alternative, to import the route from an external source. Herein, an external source may be any commercially available software program which automatically performs an estimation of route placement. As an example, such router programs may include Cell3, which is commercially available from and manufactured by Cadence Design Systems, U.S.A., and IC Craftsman, which is commercially available from and manufactured by Cooper and Chang, U.S.A. Functionally, the router 113, which functions as part of the IRIS system 100, performs the same functions as does an external router.

Figure 4:
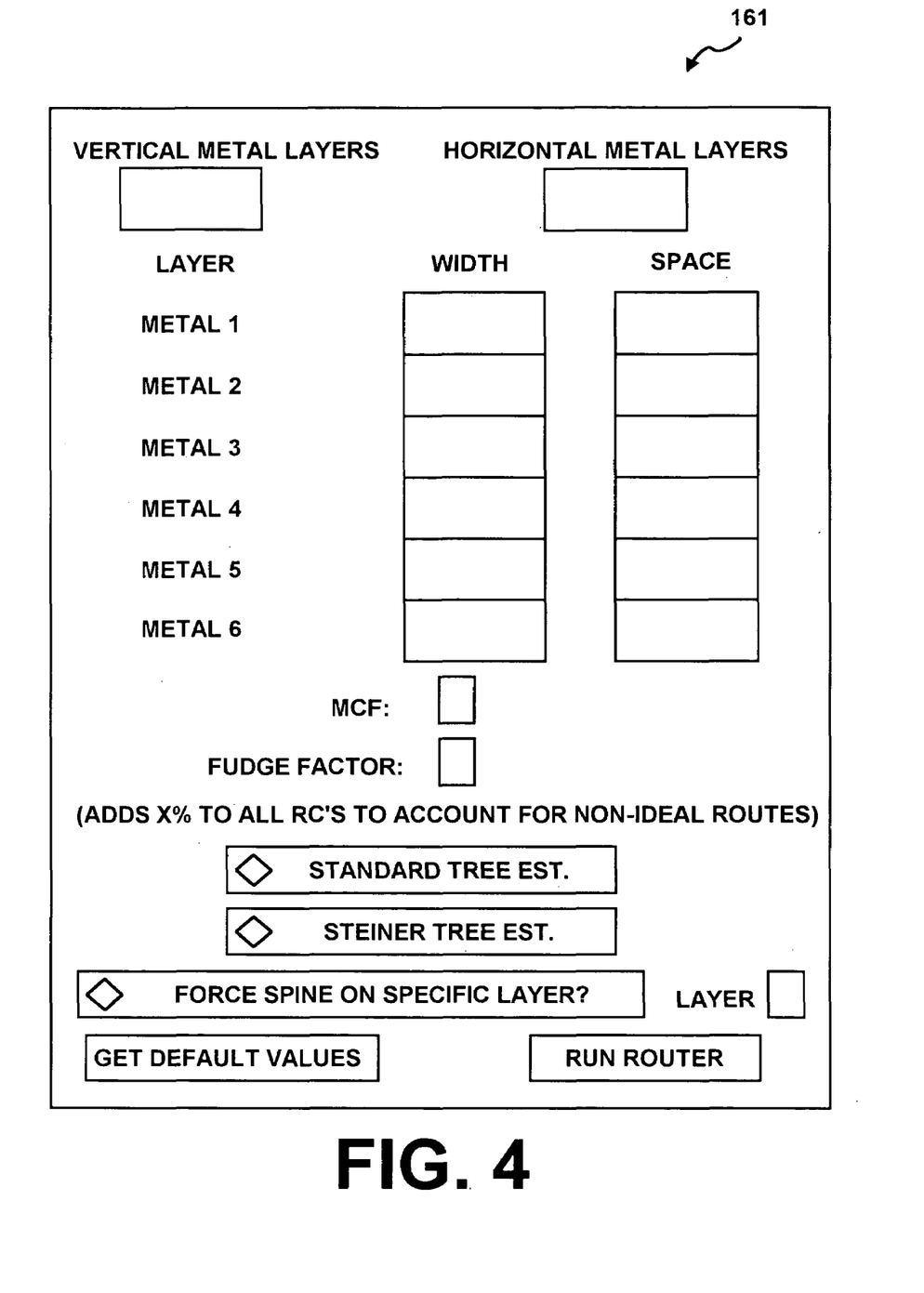
FIG. 4 shows an example of an input screen displayed by the router of FIG. 1, wherein a user may input data to define a route.

FIG. 4 shows an example of an input screen 161 displayed by the router 113 wherein a user may input data to define a route. Within the router options, the number of vertical metal layers and the number of horizontal layers may be specified, thereby designating which physical metal layers are to be utilized in the creation of the route. The width of the interconnect and the spacing between adjacent interconnect on each layer is also specified. A miller coupling factor may then be designated, ranging, in the preferred embodiment of the invention, from 0–2. A fudge factor (tolerance) is also allowed to provide for a certain allowable range of capacitance and resistance difference, thereby accounting for non-ideal routes. Options for using either standard tree estimation or steiner tree estimation are provided. If standard tree estimation is chosen, an option for forcing the spine on a specific layer is offered, along with an option to specify particularly which metal layer the spine should be located on. Finally, options are provided to the user to output the default route location values or run a router.

Figure 5:
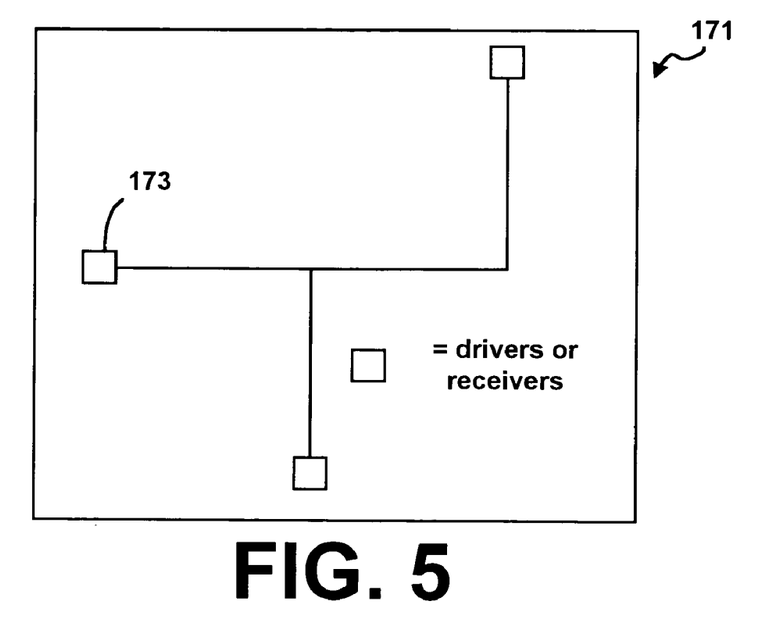
FIG. 5 shows an output screen display representing the output of the router of FIG. 1.

Referring back to FIG. 3, if the router is utilized, as indicated by block 145, the output of the router 113 is an output screen display in the form of a graph. FIG. 5 represents an example of this graphical representation 171, shown in accordance with the preferred embodiment of the invention. As shown by the key, the squares represent either drivers or receivers 173. The router 113 then performs extraction, deriving a netlist of resistance and capacitance values existing between two designated points, as indicated by block 146. When an external router is utilized, as indicated by block 147, as opposed to the router program 113, the external router's output is graphically represented, thereby creating a graphical representation. This graphical representation may then be driven to a display, printer, or other suitable output device, as indicated by block 149.

Since, an external router does not automatically derive the netlist of resistance and capacitance values, the netlist is then extracted from the graphical representation by utilizing an artwork extraction tool, as indicated by block 151. Such an extraction tool may include, but is not limited to, the Arcadia program, which is manufactured by and commercially available from Cadence Design Systems, U.S.A.

Whether the netlist was created by using the router 113, as indicated by block 145, or by using an external router, as indicated by block 147, the netlist of resistance and capacitance values is transmitted to the SPO SYSTEM 111 for the insertion of repeaters, as indicated by block 153.

Figure 6:
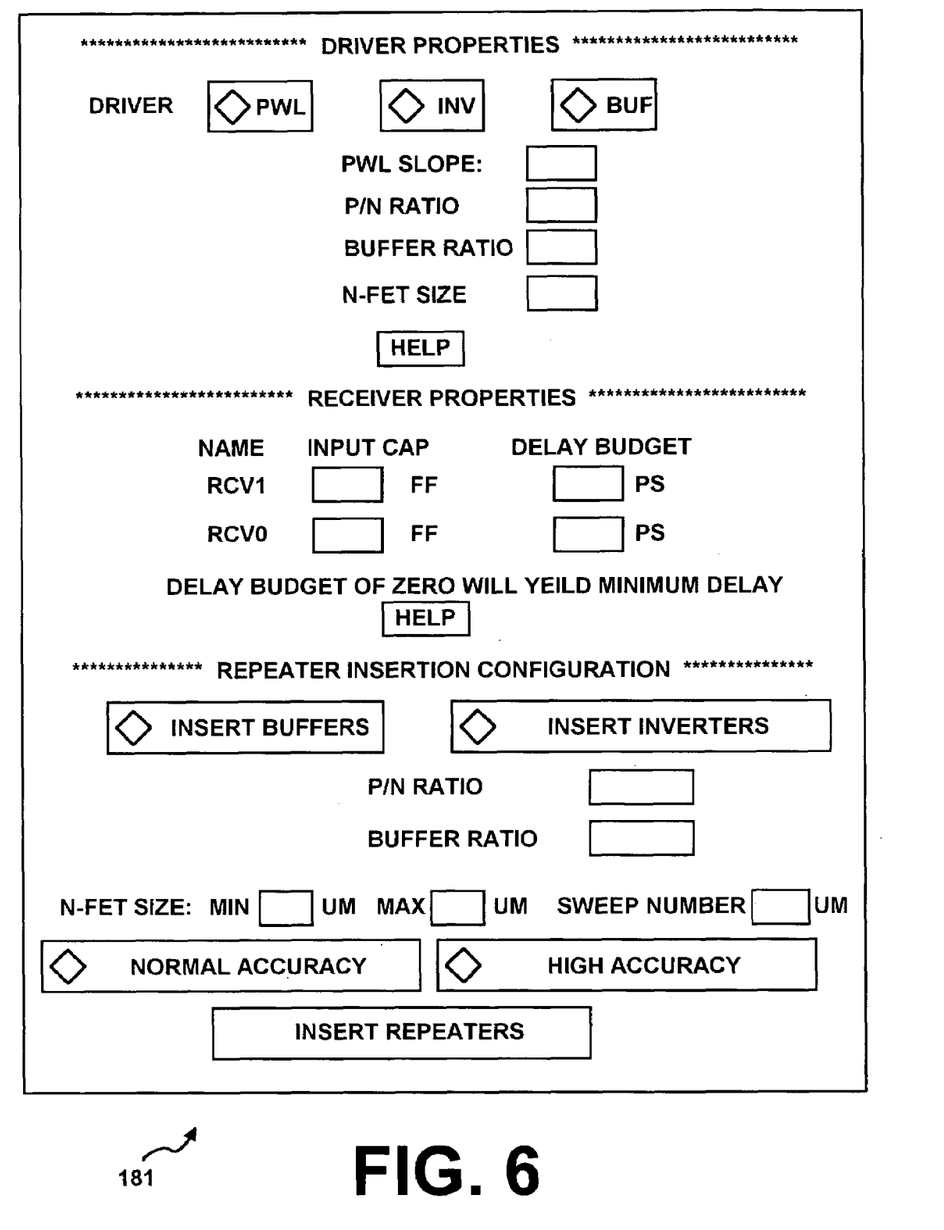
FIG. 6 shows an example of an input screen display for configuring the simultaneous path optimizer of FIG. 1.

An example of an SPO screen display 181 for user configuration is shown by FIG. 6. As shown, driver properties may first be specified. In accordance with this example the driver may be designated as either a P W Linear (PLW), which is a SPICE waveform, an inverter, or a buffer, which is 2 cascaded CMOSFET inverters. The PWL slope, p/n ration, buffer ratio and n-fet size may then be specified by the software user. Explaining in succession, the PWL slope is simply the slope of the beforementioned PWL which symbolizes an inputted signal as opposed to a driver; the p/n ratio is the ratio of p-FETs to n-FETs; the buffer ratio is the ratio of the first inverter to the second inverter; and the n-FET size is the size of the driver n-FET. Therefore, if the n-FET size and p/n ratio are known, the p-FET size may be calculated.

Receiver properties may also be specified. The characteristics which may be designated by the user relative to receiver properties include the receiver input capacitance and delay constraint. Herein, the delay constraint is the maximum allowable interconnect delay from the driver to the receiver.

A repeater insertion configuration may then be designated by the user. Herein the user may specify whether to insert buffers or inverters, as well as the p/n ratio and buffer ratio. N-FET size characteristics may also be specified, including a minimum and maximum size, as well as the number of sweeps to be performed between the minimum and maximum n-FET calculations. As an example, if the minimum n-FET size was designated as 30 um and the maximum at 90 um, a sweep number of 7 would calculate repeater insertion for sizes 30 um, 40 um, 50 um, 60 um, 70 um, 80 um, and 90 um. Finally, normal accuracy or high accuracy may be chosen before inserting the repeaters, wherein high accuracy uses SPICE as the final simulator and normal accuracy uses Elmore delay.

Figure 7:
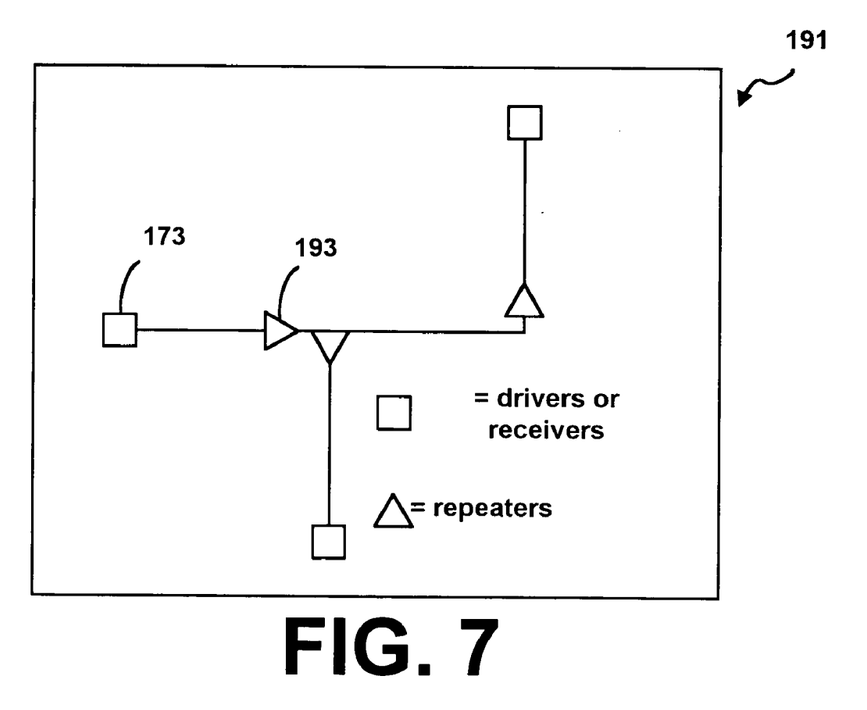
FIG. 7 shows a graphical representation of the output of the simultaneous path optimizer of FIG. 1.

FIG. 7 represents an example of an output screen display by the SPO SYSTEM after repeater insertion 191, shown in accordance with the preferred embodiment of the invention. As shown by the key, the squares represent either drivers or receivers 173, and the triangles represent repeaters 193.

Figure 8:
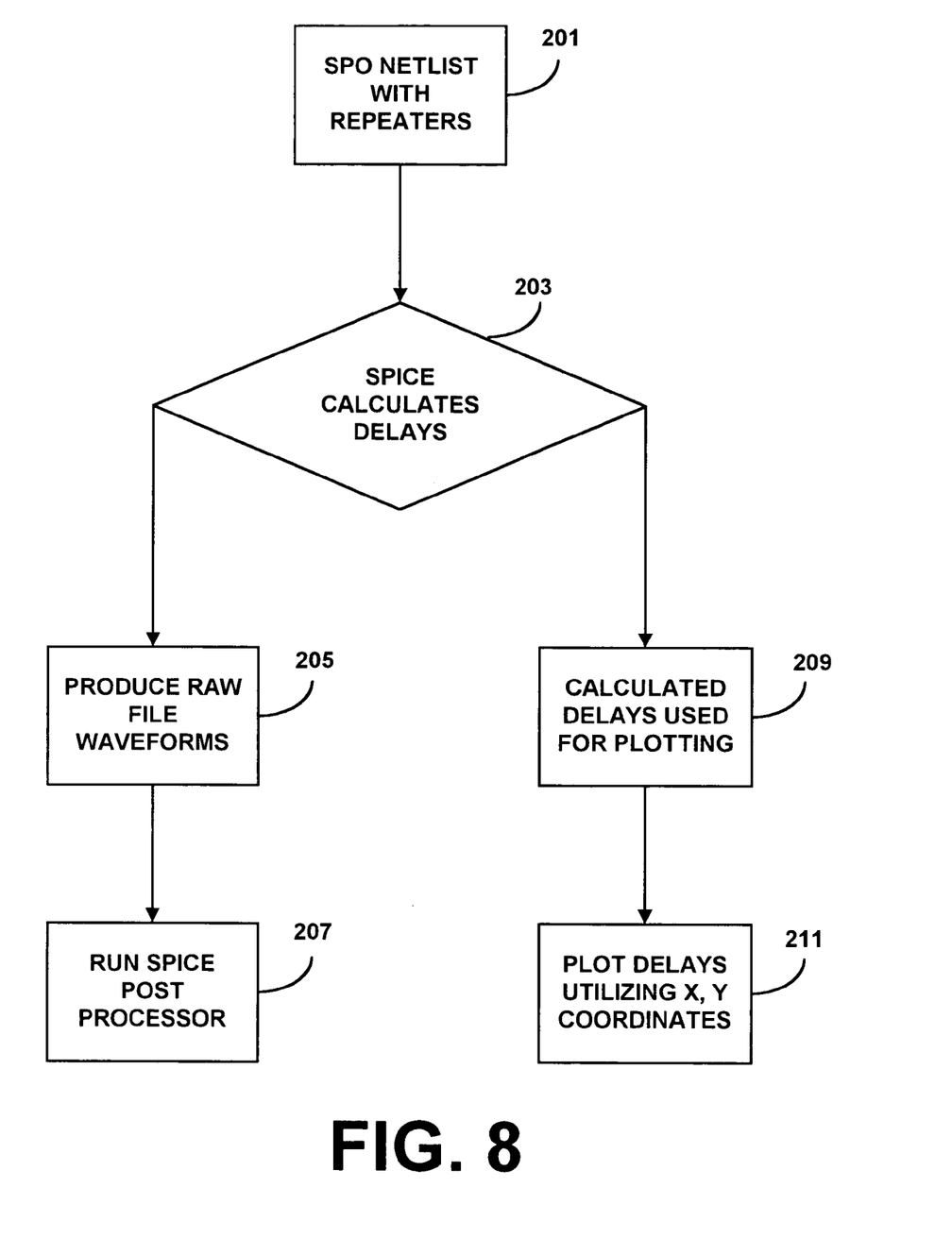
FIG. 8 is a flow chart illustrating the architecture, functionality, and operation of a possible implementation of the process of plotting the interconnect propagation delays, which is performed by the simultaneous path optimizer of FIG. 1.

FIG. 8 is a flow chart illustrating the architecture, functionality, and operation of a possible implementation of the process of plotting the interconnect propagation delays, which is performed by the SPO SYSTEM 111. In accordance with the preferred embodiment of the invention, after receiving the netlist of resistance and capacitance values, and other values as mentioned above, the SPO SYSTEM 111 performs repeater insertion and creates a new netlist, as indicated by block 201. The new netlist consists of the X and Y coordinates of the inserted repeaters, the resistances and capacitances of the original netlist, and the connectivity of the repeaters. A graphical representation of these calculated coordinates may also be displayed.

The IRIS system 100 then utilizes a delay simulator 114, such as the program SPICE, to calculate delays, as indicated by block 203. According to the preferred embodiment of the invention, the delay simulator 114 calculates the propagation delays between designated points, which in the preferred embodiment of the invention is calculated in nanoseconds. In accordance with the preferred embodiment of the invention, and as indicated by block 205, the delay simulator 114 may then produce the raw file waveforms. The delay simulator 114 may then utilize a post processor to plot these waveforms for user recognition and acknowledgment of delays, as indicated by block 207.

In the alternative, as indicated by block 209, the calculated delays may be plotted utilizing a plotting software, as would be known by one of ordinary skill in the art. If an external software package is used to calculate the propagation delays, the delays are then plotted on a graph utilizing orthogonal x and y coordinates, as indicated by block 211.

Figure 9:
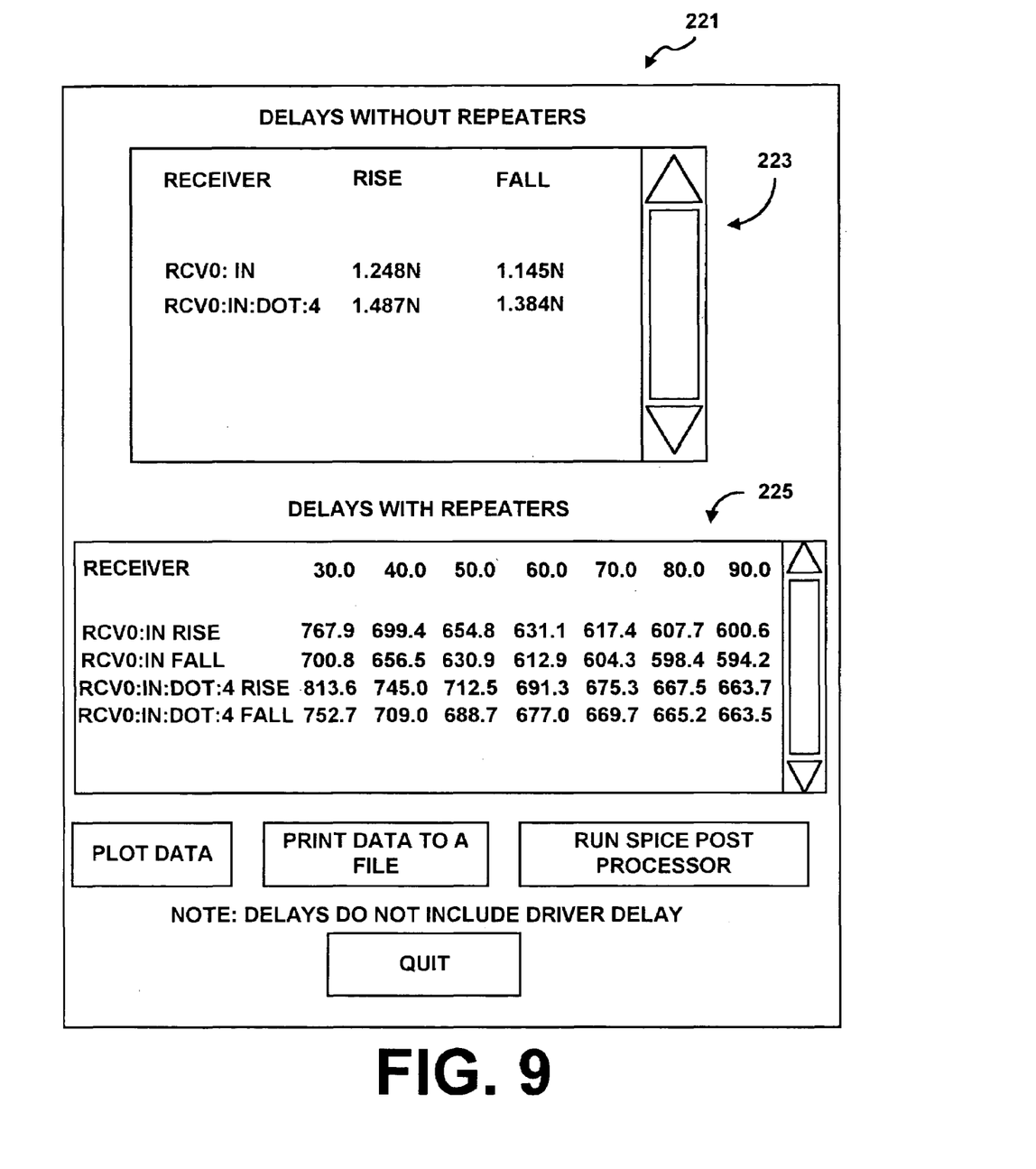
FIG. 9 shows an output screen display of the simultaneous path optimizer of FIG. 1 displaying the interconnect propagation delays with and without repeaters.

FIG. 9 is an example of an output screen display 221 by the SPO system 111, showing the interconnect propagation delays of two separate receivers. Outputted are the rise and fall delays without repeaters 223 and with repeaters 225. For the display with repeaters 225, the minimum and maximum FET size is displayed, as well as a number of calculations performed, accounting for the sweep number specified by the user (FIG. 6). The user is also supplied with the option of plotting the data, printing the data to a file, or running a spice post processor.

Figure 10:
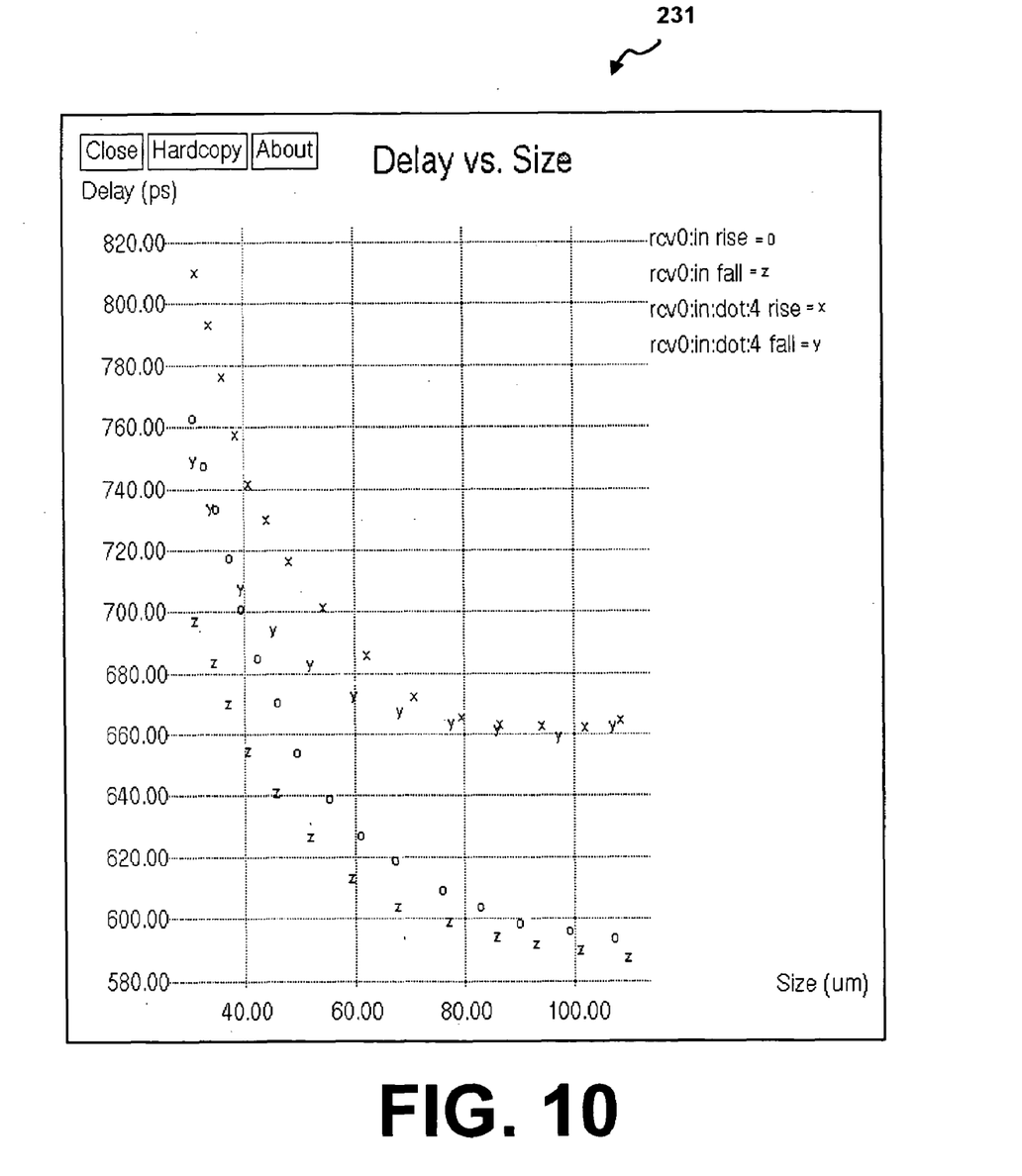
FIG. 10 shows an output screen display of the simultaneous path optimizer of FIG. 9 wherein plotting of data has been selected.

FIG. 10 is an example of a screen display output 231 displayed if the user chooses the plot data option provided by the SPO output of FIG. 9. The chart displayed is characterized by the propagation delay shown on the y-axis and the FET size on the x-axis. As shown, both the rise and fall of two different receivers is plotted.

Figure 11:
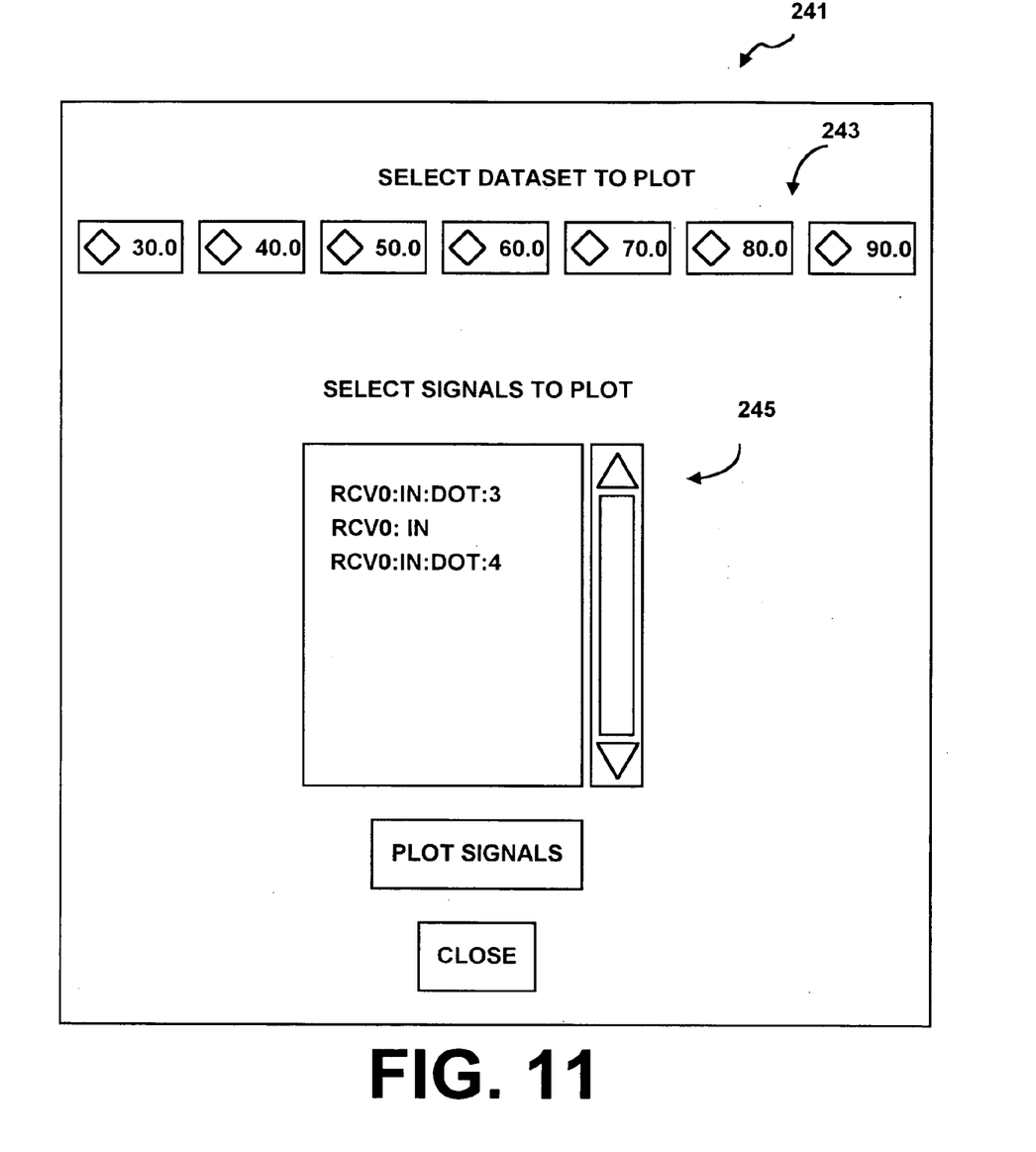
FIG. 11 shows an output screen display returned by the simultaneous path optimizer of FIG. 9 in response to selecting the option of running the SPICE post processor.
Figure 12:
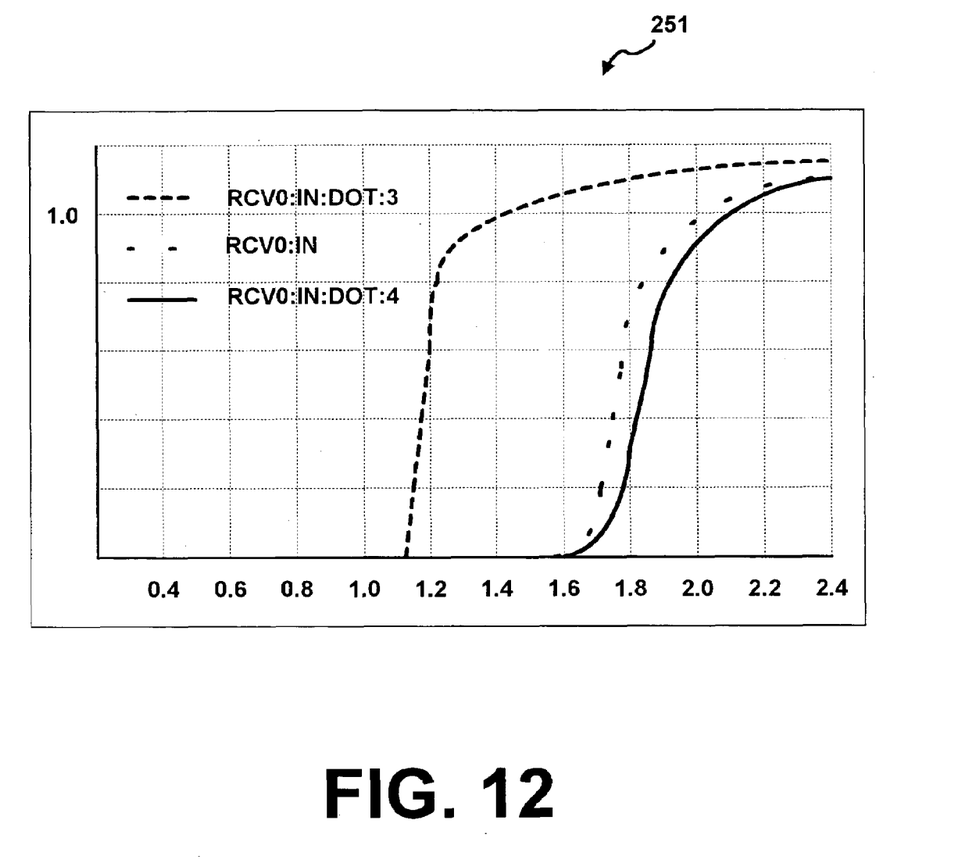
FIG. 12 shows an output screen which is displayed after selecting the dataset and signals to plot from the output screen display of FIG. 11.

If the run spice post processor option is chosen from the SPO output of FIG. 9, a form of the screen display shown by FIG. 11 is returned to the user 241. The user is then given the option of selecting the dataset to plot 243, relating to specific FET sizes. The IRIS system user may also designate the signals to plot 245. These signals relate the delays of either a receiver, such as rcv0:in or rcv0:in:dot:4, a driver, or a repeater. After choosing to plot the chosen signal for the chosen FET sizes, a screen display of the values 251 is displayed as shown by FIG. 12, thereby providing an easy to read delay analysis.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A method for inserting repeaters when designing an integrated circuit to reduce signal propagation delays in the integrated circuit, comprising:
   (a) simulating a description of an electrical network responsive to a selectable factor that accounts for a non-ideal route in the description and a plurality of selectable parameters associated with respective conductive layers of the electrical network, wherein simulating comprises obtaining signal propagation delays associated with respective branches of said network to generate a first electrical network simulation;
   (b) generating a first graphical representation responsive to a time-varying signal applied to a respective circuit branch, the first graphical representation illustrating the signal propagation delays prior to the insertion of a repeater;
   (c) using a simultaneous path optimization system to identify an optimal position of at least one repeater in at least one branch in a second electrical network simulation based on the first electrical network simulation, the optimal position responsive to at least one selectable parameter selected from the group comprising an input signal slope, a ratio of p-type field-effect transistors to n-type field-effect transistors, a buffer ratio, a field-effect transistor size, a receiver input capacitance, and a delay value;
   (d) generating a second graphical representation responsive to the time-varying signal, the second graphical representation illustrating the signal propagation delays from the second electrical network simulation, wherein the first and second graphical representations reflect signal propagation delays for the respective circuit branch of said network from the first electrical simulation and the second electrical network simulation, respectively; and
   (e) presenting the first and second graphical representations in a manner that enables observation of the effect of signal propagation delays on an output signal that results from the time-varying input signal due to selectively locating the at least one repeater in the respective circuit branch of said network.

2. The method of claim 1, further comprising:
   (f) determining whether said at least one repeater should be inserted, where simulated, based upon signal propagation delays associated with said branches.

3. The method of claim 1, wherein presenting comprises a table of delay values associated with respective receiver sizes.

4. The method of claim 1, wherein presenting comprises a two-dimensional plot of delay along a first axis and repeater size along a second axis orthogonal to the first axis.

5. The method of claim 1, wherein simulating a description of an electrical network is performed in response to a plurality of operator configurable values associated with a spatial measure of a electrical conductors.

6. The method of claim 1, wherein simulating a description of an electrical network is performed in response to a plurality of operator configurable values associated with the distance between adjacent electrical conductors.

7. The method of claim 1, wherein simulating a description of an electrical network indicates a source node, a plurality of sink nodes, a plurality of electrical branches connecting said source node with each said sink node, a plurality of resistance values associated respectively with said branches, a plurality of capacitance values associated respectively with said branches, and a plurality of timing constraints associated respectively with said sinks, each said timing constraint representing a maximum propagation time delay between said source and a respective one of said sinks; and wherein said main branch is determined based upon analyzing said signal propagation delays from said source to each said sink and said timing constraints.

8. The method of claim 7, wherein using a simultaneous path optimization system comprises:
determining a slack parameter for each branch of said network, said slack parameter being computed for each branch by mathematically combining a signal propagation delay associated said each branch with a timing constraint associated with said each branch; and
identifying said main branch as the one of said branches that exhibits the largest one of said slack parameters.

9. A system for determining locations at which to insert repeaters in an integrated circuit to reduce signal propagation delays in the integrated circuit, comprising:
means for receiving a description of an electrical network;
means for simulating signal propagation delays associated with respective branches of said network to generate a first electrical network simulation, the first electrical network simulation responsive to a selectable factor that accounts for a non-ideal route in the description a plurality of selectable parameters associated with respective conductive layers of the electrical network;
means for generating a first graphical representation responsive to a time-varying signal applied to a respective circuit branch, the first graphical representation illustrating the first electrical network simulation prior to the insertion of a repeater;
means for identifying an optimal position of at least one repeater in at least one branch in a second electrical network simulation based on the first electrical network simulation;
means for generating a second graphical representation responsive to the second electrical network simulation, wherein the first and second graphical representations reflect signal propagation delays for respective branches of said network from the first electrical simulation and the second electrical network simulation, respectively; and
means for presenting the first and second graphical representations in a manner that enables an operator of the system to observe the effect on signal propagation delays on an output signal that results from the time-varying input signal over an entire branch due to inserting the at least one repeater in the respective circuit branch of said network.

10. The system of claim 9, wherein said means for receiving receives a network description that indicates a source node, a plurality of sink nodes, a plurality of electrical branches connecting said source node with each said sink node, a plurality of resistance values associated respectively with said branches, a plurality of capacitance values associated respectively with said branches, and a plurality of timing constraints associated respectively with said sinks, each said timing constraint representing a maximum propagation time delay between said source and a respective one of said sinks; and wherein said main branch is determined based upon analyzing signal propagation delays from said source to each said sink and said timing constraints.

11. The system of claim 10, further comprising:
means for determining a slack parameter for each branch of said network before and after insertion and simulation of said at least one repeater, said slack parameter being computed for each branch by mathematically combining a signal propagation delay associated with said each branch and a timing constraint associated with said each branch;
means for producing first and second total slack parameters by mathematically combining said slack parameters before and after said insertion and simulation; and
means for determining whether said at least one repeater should be inserted, where simulated, based upon whether said total slack parameter decreases with insertion of said at least one repeater.

12. The system of claim 9, wherein said means for identifying an optimal position of at least one repeater comprises:
means for determining a slack parameter for each branch of said network, said slack parameter being computed for each branch by mathematically combining a signal propagation delay associated said each branch with a timing constraint associated with said each branch; and
means for identifying said main branch as the one of said branches that exhibits the largest one of said slack parameters.

13. The system of claim 9, further comprising:
means for providing information pertaining to repeater locations and connectivity.

14. The system of claim 9, wherein the means for presenting comprises a table of delay values associated with respective receiver sizes.

15. The system of claim 9, wherein the means for presenting comprises a two-dimensional plot of delay along a first axis and repeater size along a second axis orthogonal to the first axis.

16. The system of claim 9, wherein the means for simulating signal propagation delays is performed in response to a plurality of operator configurable values associated with a spatial measure of a plurality of electrical conductors.

17. The system of claim 9, wherein the means for simulating signal propagation delays is performed in response to a plurality of operator configurable values associated with the distance between adjacent electrical conductors.

18. A workstation, comprising:
a processor configured to receive and execute a plurality of executable instructions;
a memory coupled to the processor, the memory comprising an interactive repeater insertion simulator comprising:
logic configured to receive a description of an electrical network;
logic configured to simulate signal propagation delays associated with respective branches of said network to generate a first electrical network simulation responsive to a selectable factor that accounts for non-ideal routes in the description, a plurality of selectable parameters associated with respective conductive layers of the electrical network;

logic configured to generate a first graphical representation responsive to the first electrical network simulation prior to the insertion of a repeater;

logic configured to identify an optimal position of at least one repeater in at least one branch in a second electrical network simulation based on the first electrical network simulation, the optimal position responsive to at least one selectable parameter selected from the group comprising an input signal slope, a ratio of p-type field-effect transistors to n-type field-effect transistors a buffer ratio, a field-effect transistor size a receiver input capacitance, and a delay value;

logic configured to generate a second graphical representation responsive to a time-varying input signal, the second graphical representation illustrating the signal propagation delays from the second electrical network simulation, wherein the first and second graphical representations reflect signal propagation delays for respective branches of said network from the first electrical simulation and the second electrical network simulation, respectively; and logic configured to present the first and second graphical representations in a manner that enables an operator of the workstation to simultaneously observe the effect on signal propagation delays on an output signal that results from the time-varying input signal due to automatically inserting the at least one repeater along the respective branches of said network.

19. The workstation of claim 18, wherein said logic configured to receive receives a network description that indicates a source node, a plurality of sink nodes, a plurality of electrical branches connecting said source node with each said sink node, a plurality of resistance values associated respectively with said branches, a plurality of capacitance values associated respectively with said branches, and a plurality of timing constraints associated respectively with said sinks, each said timing constraint representing a maximum propagation time delay between said source and a respective one of said sinks; and wherein said main branch is determined based upon analyzing signal propagation delays from said source to each said sink and said timing constraints.

20. The workstation of claim 18, wherein the logic configured to identify an optimal position of at least one repeater further comprises:

logic configured to determine a slack parameter for each branch of said network before and after insertion and simulation of said at least one repeater, said slack parameter being computed for each branch by mathematically combining a signal propagation delay associated with said each branch and a timing constraint associated with said each branch;

logic configured to produce first and second total slack parameters by mathematically combining said slack parameters before and after said insertion and simulation; and logic configured to determine whether said at least one repeater should be inserted, where simulated, based upon whether said total slack parameter decreases with insertion of said at least one repeater.

21. The workstation of claim 18, wherein the logic configured to identify an optimal position of at least one repeater comprises:

logic configured to determine a slack parameter for each branch of said network, said slack parameter being computed for each branch by mathematically combining a signal propagation delay associated said each branch with a timing constraint associated with said each branch; and logic configured to identify said main branch as the one of said branches that exhibits the largest one of said slack parameters.

22. The workstation of claim 18, further comprising:

logic configured to provide information pertaining to repeater locations and connectivity.

23. The workstation of claim 18, wherein the logic configured to present generates a table of delay values associated with respective receiver sizes.

24. The workstation of claim 18, wherein the logic configured to present generates a two-dimensional plot of delay along a first axis and repeater size along a second axis orthogonal to the first axis.

* * * * *

UNITED STATES PATENT AND TRADEMARK OFFICE
CERTIFICATE OF CORRECTION

PATENT NO. : 6,928,401 B1  
APPLICATION NO. : 09/329556  
DATED : August 9, 2005  
INVENTOR(S) : John D Wanek It is certified that error appears in the above-identified patent and that said Letters Patent is hereby corrected as shown below:

In column 7, line 66, delete "rcvO:in or rcvO:in:dot:4," and insert -- rcv0:in or rcv0:in:dot:4, --, therefor.

In column 9, line 27, in Claim 8, after "associated" insert -- with --.

In column 9, line 39, in Claim 9, after "description" insert -- , --.

In column 10, line 32, in Claim 12, after "associated" insert -- with --.

In column 11, line 13, in Claim 18, after "transistors" insert -- , --.

In column 11, line 14, in Claim 18, after "size" insert -- , --.

In column 12, line 27, in Claim 21, after "associated" insert -- with --.

Signed and Sealed this

Twenty-eighth Day of July, 2009

JOHN DOLL  
*Acting Director of the United States Patent and Trademark Office*